(12) United States Patent
Eiman

(10) Patent No.: US 8,482,246 B2
(45) Date of Patent: Jul. 9, 2013

(54) CUSTOMIZED SHADING DEVICES INCLUDING PHOTOVOLTAIC PROPERTIES

(76) Inventor: Christopher Scott Eiman, Chanhassen, MN (US)

(*) Notice: Subject to any disclaimer, the term of this patent is extended or adjusted under 35 U.S.C. 154(b) by 514 days.

(21) Appl. No.: 12/499,138

(22) Filed: Jul. 8, 2009

(65) Prior Publication Data
US 2010/0033126 A1 Feb. 11, 2010

Related U.S. Application Data

(60) Provisional application No. 61/134,366, filed on Jul. 9, 2008.

(51) Int. Cl.
*H01M 6/50* (2006.01)
*H01L 25/00* (2006.01)

(52) U.S. Cl.
USPC ........... 320/101; 136/243; 136/244; 136/251; 136/252

(58) Field of Classification Search
CPC .......................................... H02J 7/35
USPC .......................................... 320/101
See application file for complete search history.

(56) References Cited

U.S. PATENT DOCUMENTS

| | | | | |
|---|---|---|---|---|
| 5,433,259 A * | 7/1995 | Faludy | ............................. | 160/67 |
| 2004/0232878 A1* | 11/2004 | Couch et al. | ................... | 320/101 |
| 2005/0268957 A1* | 12/2005 | Enomoto et al. | .............. | 136/244 |
| 2007/0283987 A1* | 12/2007 | Reyes et al. | ..................... | 135/16 |
| 2009/0014130 A1* | 1/2009 | Heidenreich | .................. | 160/66 |
| 2009/0032100 A1* | 2/2009 | Oak | .............................. | 136/259 |
| 2009/0040750 A1* | 2/2009 | Myer | ............................ | 362/183 |

* cited by examiner

*Primary Examiner* — Edward Tso
*Assistant Examiner* — Ahmed Omar
(74) *Attorney, Agent, or Firm* — Jennifer S. Konieczny

(57) ABSTRACT

A customized awning, window covering or other shading device that includes customized photovoltaic modules, panels or other photovoltaic-type devices and capabilities. The awning includes a cost-effective, energy-efficient means of providing solar power to run low-voltage devices at a desired interior or exterior location, while also maintaining or enhancing the aesthetic appearance or physical attributes of the shading device.

17 Claims, 9 Drawing Sheets

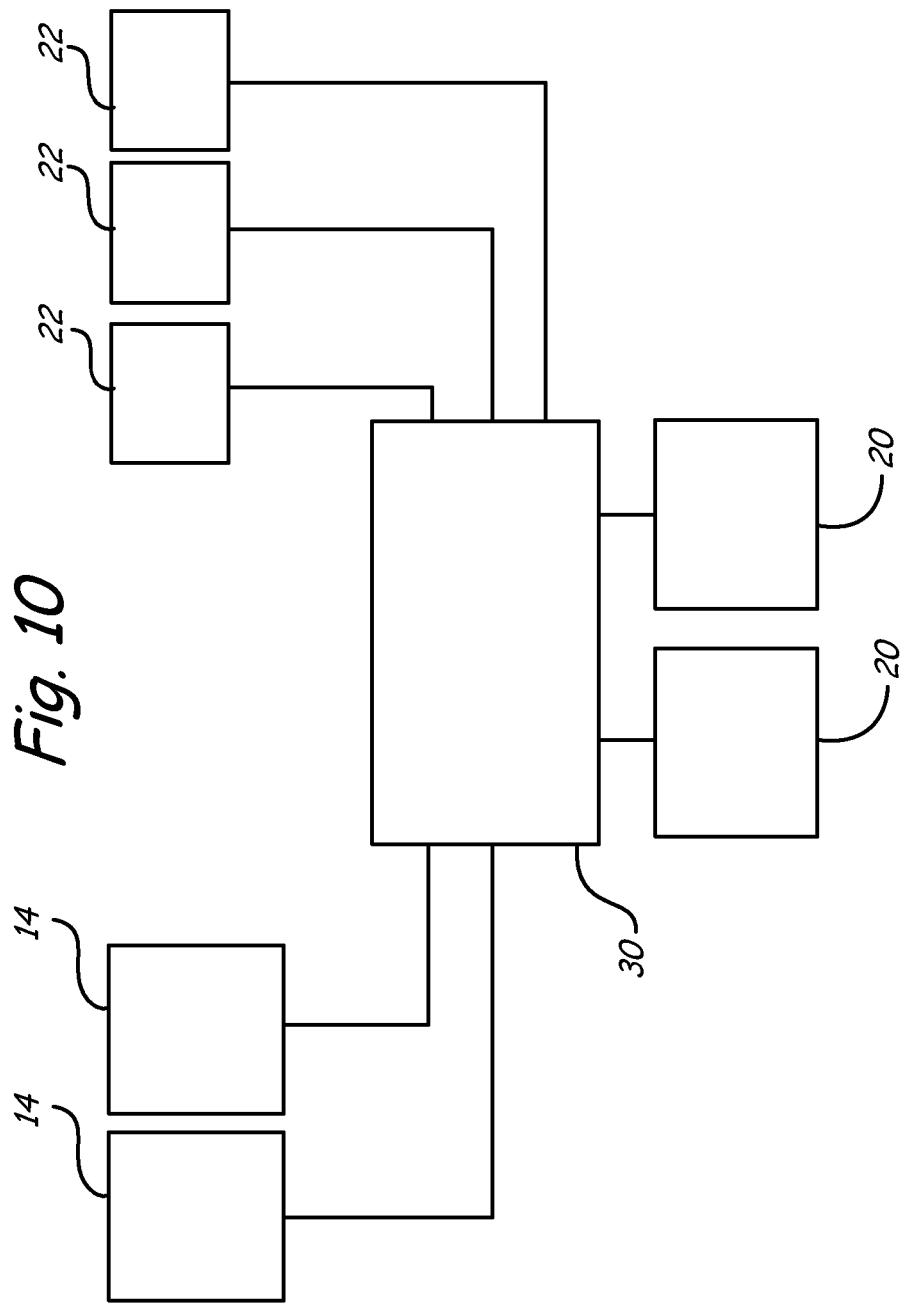

CUSTOMIZED SHADING DEVICES INCLUDING PHOTOVOLTAIC PROPERTIES

RELATED APPLICATIONS

This application claims priority to U.S. Provisional Application Ser. No. 61/134,366 filed Jul. 9, 2008 entitled Customized Shading Device Including Photovoltaic Properties and is hereby incorporated by reference.

BACKGROUND OF THE INVENTION

This invention relates to a customized awning, window covering or other shading/covering apparatus that includes photovoltaic modules, panels or other photovoltaic-type devices and capabilities.

In particular, it is known in the art that consumers use awnings and window coverings on their homes and businesses, for example, in order to provide shading or protection from light and other environmental elements (wind, rain, snow, insects, etc). Further, it is known in the art that consumers use photovoltaic modules, panels and other devices (also known as solar panels or solar cells) to generate energy for their homes or businesses. There are numerous patents that describe some form of solar energy devices, ranging from basic to complex applications using solar energy and/or solar energy-generating devices (for example, US Publication No. 2005/0263178, which is herein incorporated by reference in its entirety). However, many such devices are complicated, requiring (at a minimum) knowledge of implementing and managing solar energy-generating equipment, as well as expert knowledge in the art of solar energy generation and special tooling to effectively place or use a device or system. Or fixtures such as solar panels are often static in size and/or application and, as result, can be costly, complicated to use or install or inadequate to perform if a customized application and use is desired.

There exists a need for a device that provides cost-effective, energy-efficient, customizable solutions that are easy to install and use, while also providing an aesthetically pleasing effect.

SUMMARY OF THE INVENTION

In one aspect, the present invention provides a customized shading device including photovoltaic capabilities.

In another aspect, the present invention provides a device that is easy to install.

In yet another aspect, the present invention provides a device that cost-effective to manufacture and purchase.

In yet another aspect, the present invention provides a device that may be custom manufactured based on both shading and energy needs.

In yet another aspect, the present invention includes a device that provides a reliable, cost-effective and efficient source of energy.

In yet another aspect, the present invention includes a device that provides a reliable, cost-effective source of energy at a location where common electricity sources may be limited or unreachable.

In yet another aspect, the present invention includes a device that provides a reliable, rechargeable system to run low-voltage devices.

In yet another aspect, the present invention includes a device that provides a safe power source to run low-voltage devices.

BRIEF DESCRIPTION OF THE DRAWINGS

FIG. 10 is a flowchart illustrating one embodiment of a device in accordance with the present invention.

DETAILED DESCRIPTION OF THE INVENTION

Figure 1:
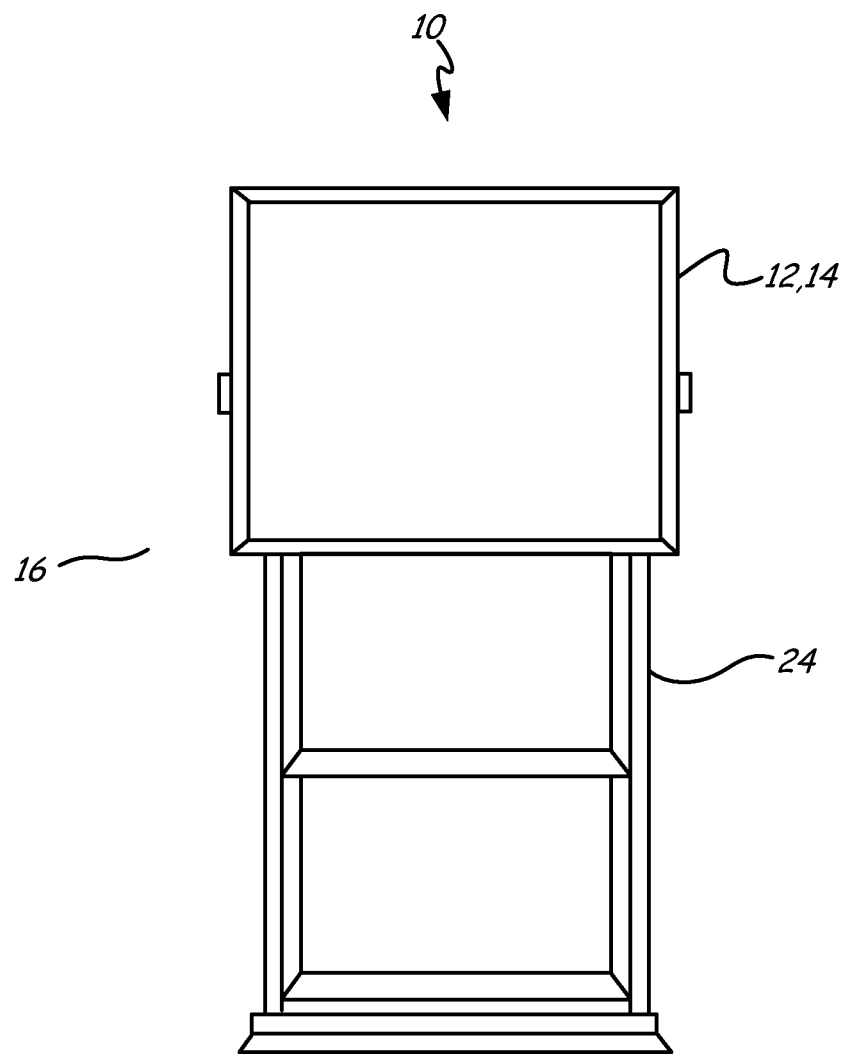
FIG. 1 is a front view of one embodiment of a device in accordance with the present invention.

FIG. 1 illustrates a device 10 according to one embodiment of the present invention. The device 10 generally includes at least one shading portion 12 that houses at least one photovoltaic portion 14. The device of this embodiment further generally includes (the following not shown in FIG. 1) wires to guide electricity from the photovoltaic portion to an energy storage portion (for example, a battery) a power control portion and at least one load (to and from which power may be directed), some of which are not shown in FIG. 1 but are nonetheless inherent to this embodiment of the invention. The device 10, as shown in FIG. 1, is mounted to a surface wall 16 of a house, in this example providing shade and elemental covering over a window 24 of the house.

Figure 2:
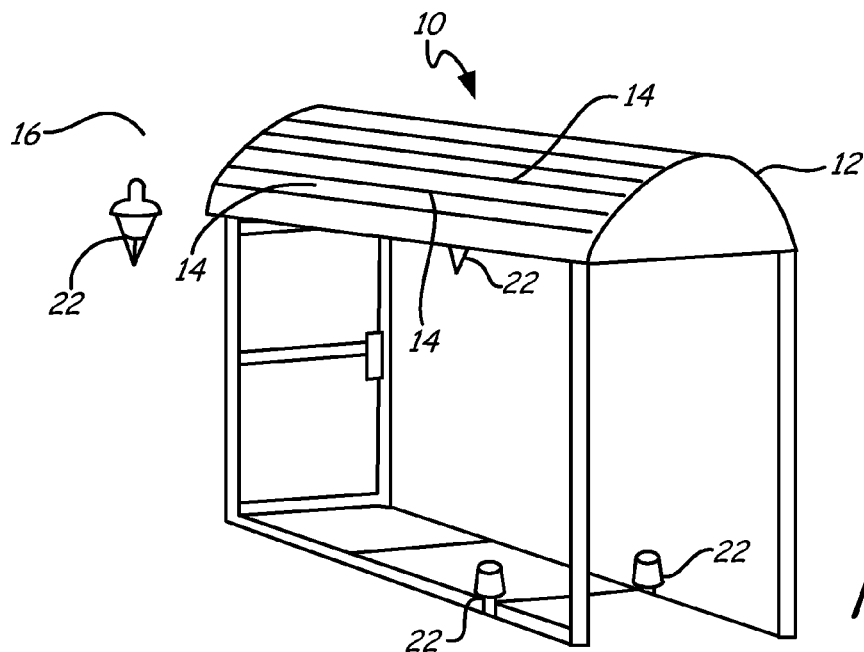
FIG. 2 is a perspective view of another embodiment of a device in accordance with the present invention.
Figure 8:
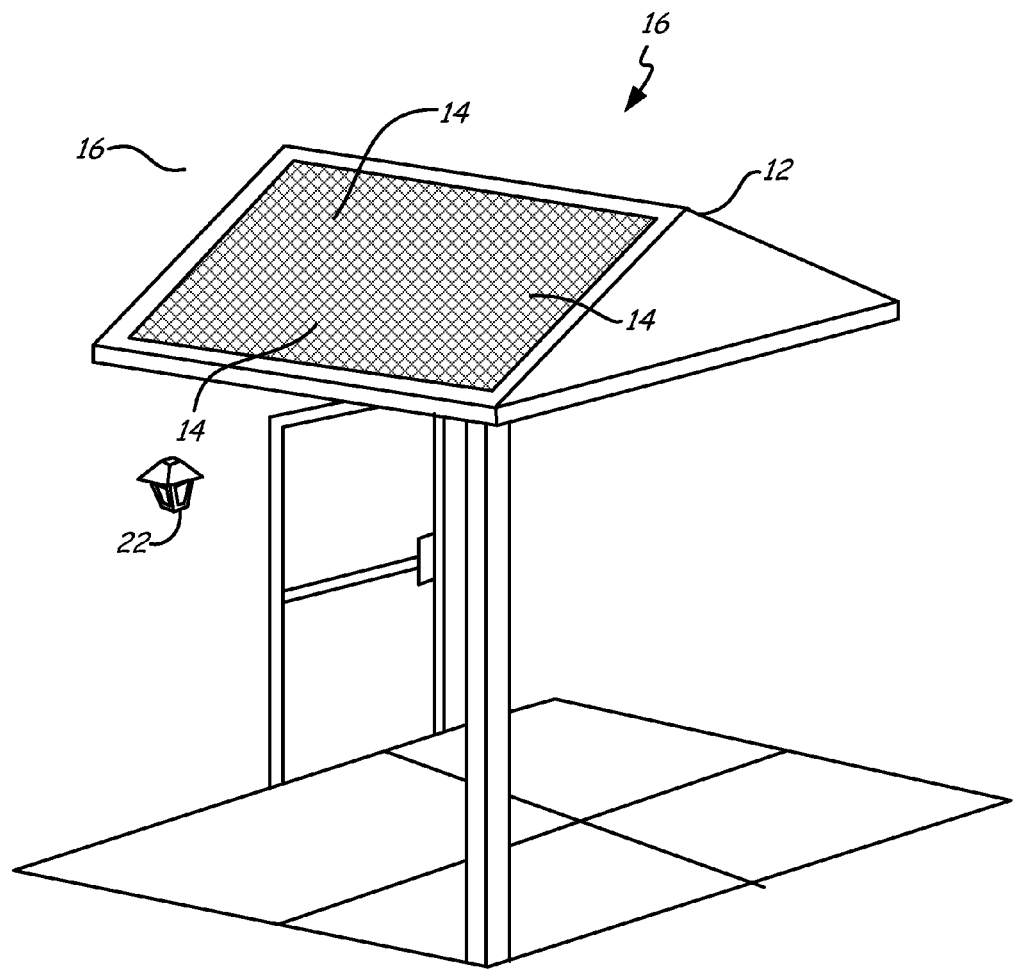
FIG. 8 is a perspective view of another embodiment of a device in accordance with the present invention.

FIGS. 2 and 8 illustrate a device 10 according to another embodiment of the present invention. The device 10 generally includes at least one shading portion 12 that houses a plurality of photovoltaic portions 14. The device 10 of this embodiment further generally includes (the following, some of which are not shown in FIGS. 2 and 8) wires to guide electricity from the photovoltaic portion to an energy storage portion, from an energy storage portion to a power control portion and thereafter, to a load 22 (for example an exterior light 22).

Figure 3:
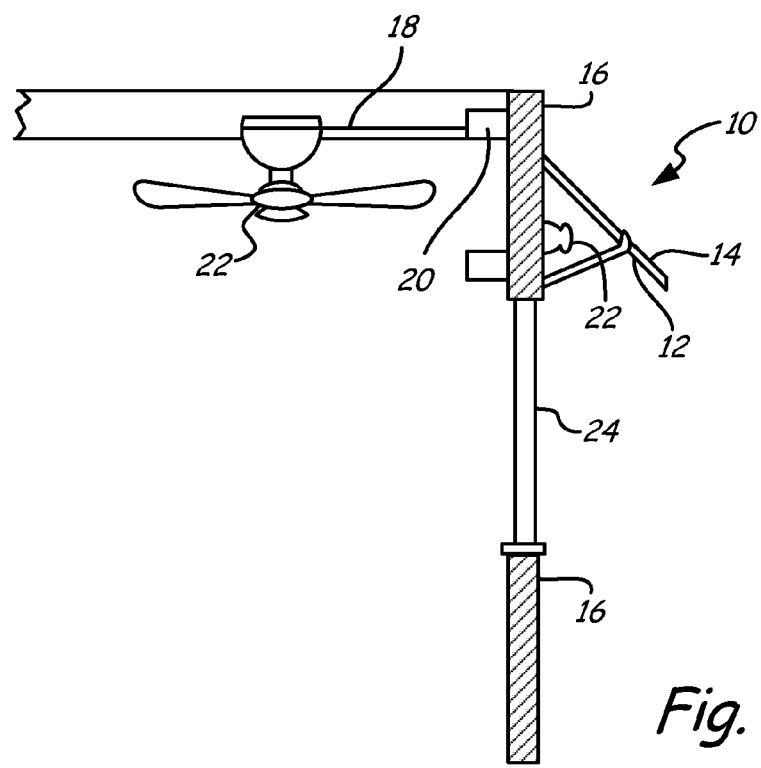
FIG. 3 is a cross-sectional side view of another embodiment of a device in accordance with the present invention.

FIG. 3 illustrates a device 10 according to another embodiment of the present invention. The device 10 generally includes at least one shading portion 12 that houses at least one photovoltaic portion 14. The device 10 of this embodiment further includes wires 18 to guide electricity from the photovoltaic portion 14 to an energy storage portion 20 and from the energy storage portion 20 to a power control portion (not shown), which thereafter directs electricity to or from a load 22 (in this embodiment, low-voltage appliances, such as a ceiling fan 22 and an exterior house light 22). The device 10 of this embodiment is affixed angularly to an exterior surface 16 of a home, above a window 24 used for shading against sun and environmental elements.

Figure 4:
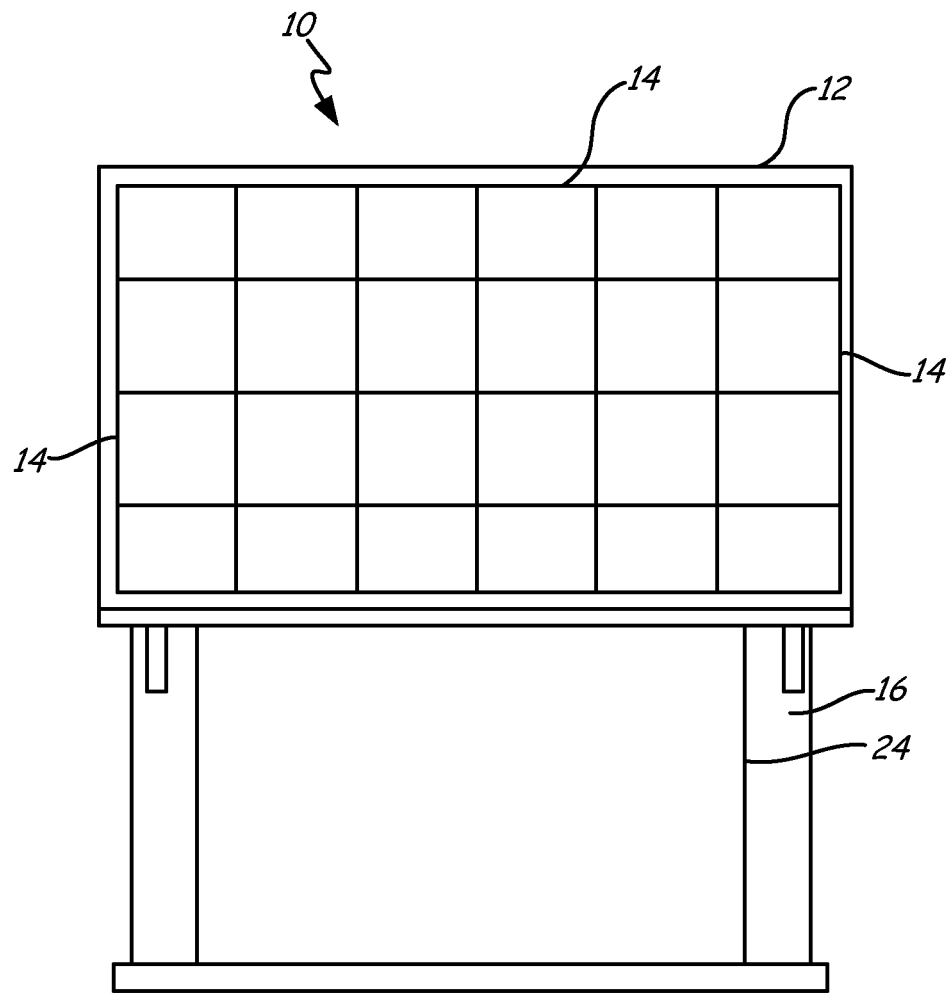
FIG. 4 is a front view of another embodiment of a device in accordance with the present invention.

FIG. 4 illustrates a device 10 according to one embodiment of the present invention. The device 10 generally includes at least one shading portion 12 that houses a plurality of photovoltaic portions 14. The device of this embodiment further generally includes wires to guide electricity from the photovoltaic portion to an energy storage portion, from an energy storage portion to a power control portion, and thereafter, directs electricity to at least one load, each of which are not shown in FIG. 4 but are nonetheless inherent to this embodiment of the invention. The device 10, as shown in FIG. 4, is mounted to a surface wall 16 of a house, in this example providing shade and elemental covering over a window 24 of the house.

Figure 5:
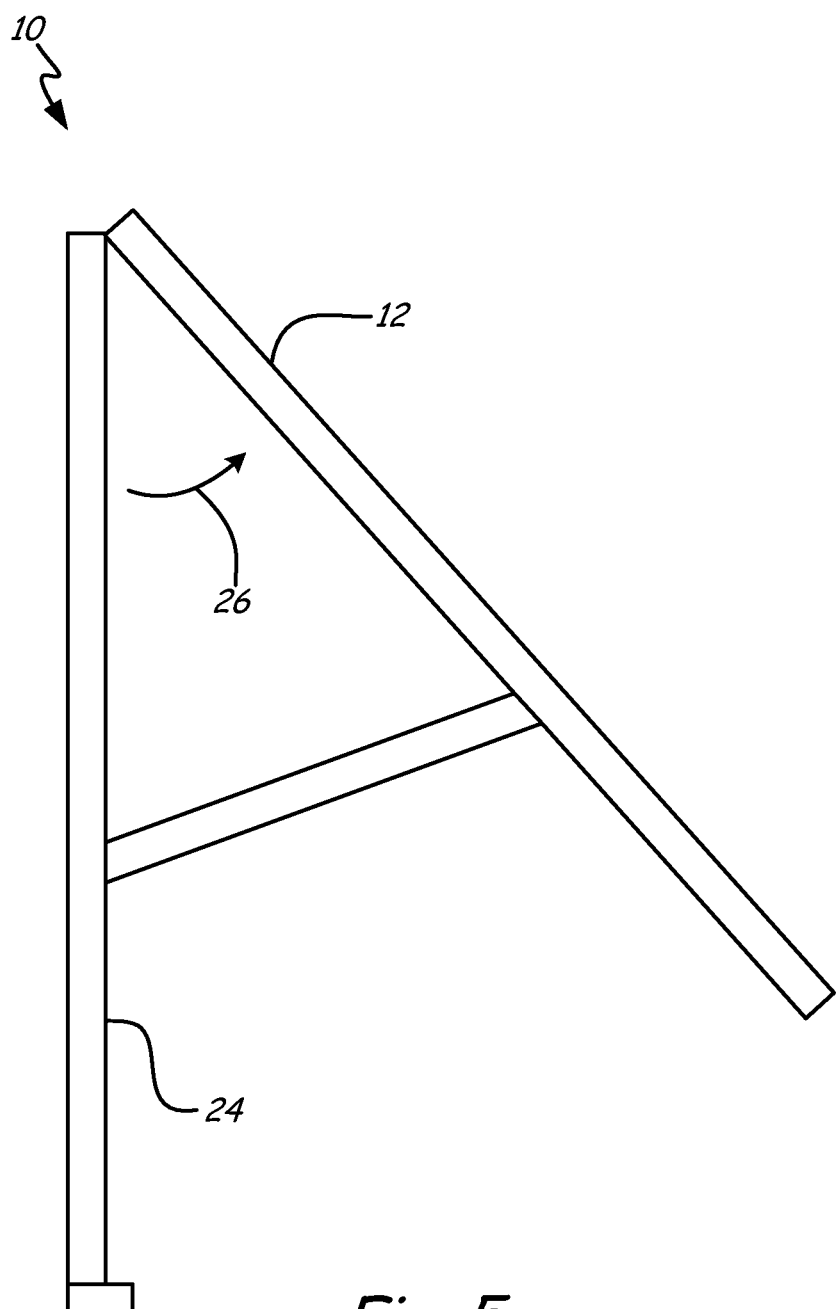
FIG. 5 is a side view of the embodiment of the device of FIG. 4 in accordance with the present invention.

FIG. 5 illustrates a side-view of the device 10 according to the embodiment shown in FIG. 4. The device 10 generally includes at least one shading portion 12 that houses a plurality of photovoltaic portions (not shown in FIG. 5). The device 10 is mounted to a surface wall 16 of the house, at a predetermined angle 26 respective to the surface wall 16 of the house, in order to obtain a desired shading results with respect to the window 24 of the house or in order to obtain a desired solar power capture/efficiency, or both.

Figure 6:
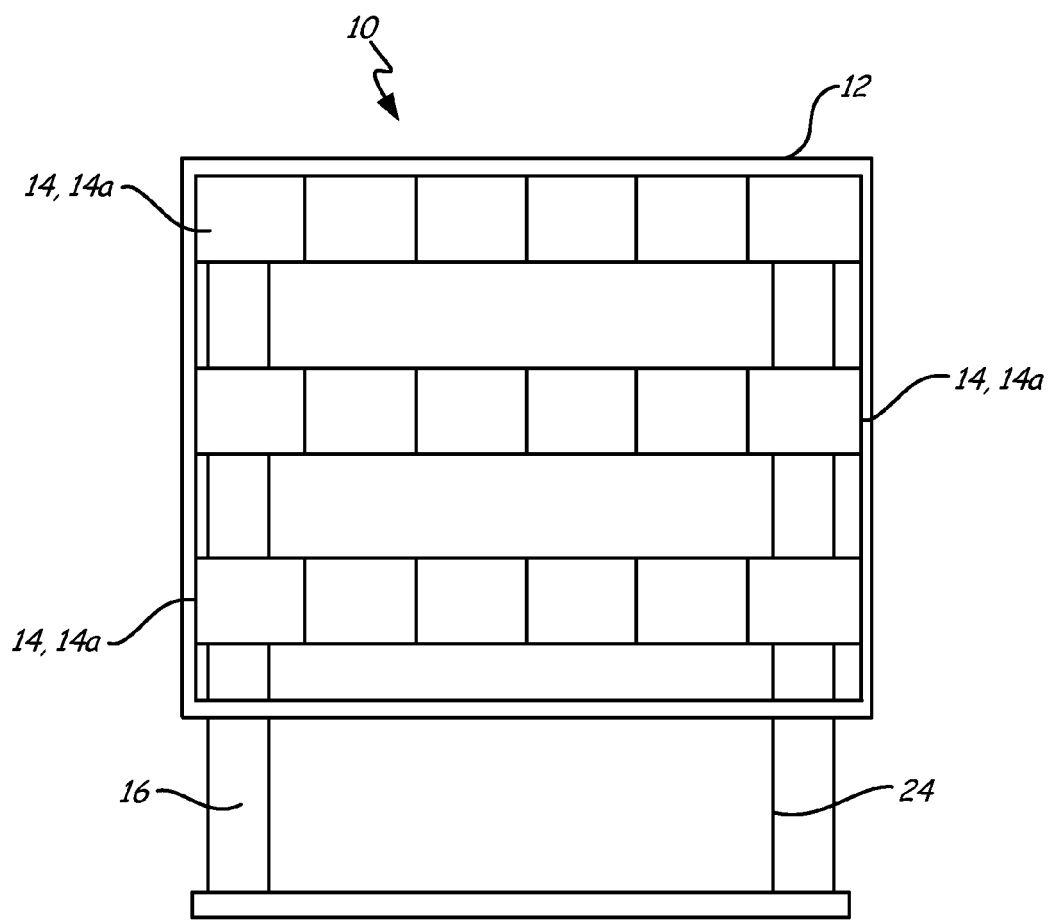
FIG. 6 is a front view of another embodiment of a device in accordance with the present invention.

FIG. 6 illustrates a device 10 according to another embodiment of the present invention. The device 10 generally includes at least one shading portion 12 that is operably connected with at least one photovoltaic portion housing 14a and at least one photovoltaic portion 14, which may or may not cover substantially all of the surface of the shading portion 12 of the device 10. In this embodiment of the present invention, the shading portion 12 houses a plurality of photovoltaic portion housings 14a and each photovoltaic housing 14a houses a plurality of photovoltaic portions 14. The device 10, as shown in FIG. 6, is mounted to a surface wall 16 of a house, in this example providing shade and elemental covering over a window 24 of the house.

Figure 7:
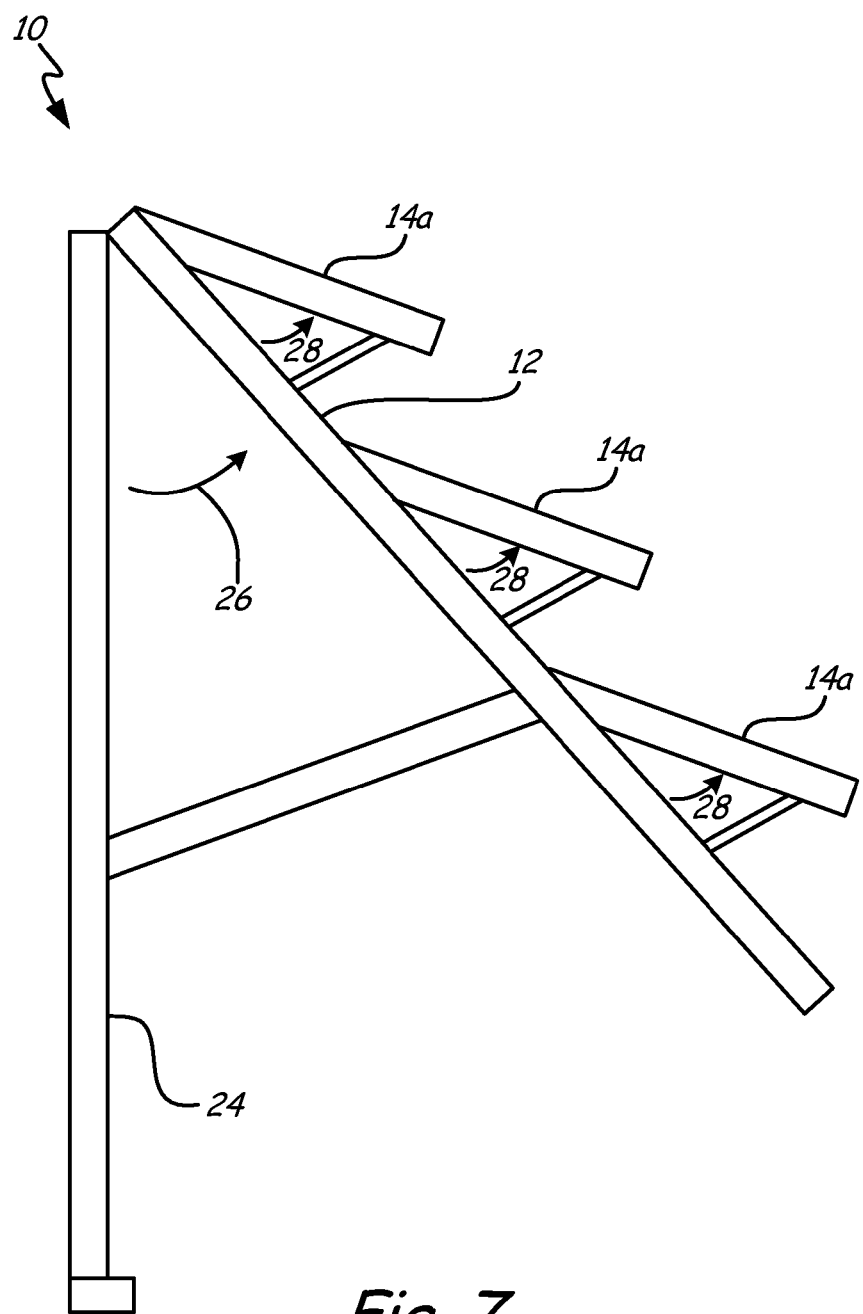
FIG. 7 is a side view of the embodiment of the device of FIG. 6 in accordance with the present invention.

FIG. 7 illustrates a side-view of the device 10 according to the embodiment shown in FIG. 6. The device 10 generally includes at least one shading portion 12 that is operably connected with at least one photovoltaic portion housing 14a, which each house, respectively, at least one photovoltaic portion (not shown). In this embodiment of the present invention, the shading portion 12 houses a plurality of photovoltaic portion housings 14a and each photovoltaic housing 14a houses a plurality of photovoltaic portions (not shown). The device 10 is mounted to a surface wall 16 of the house, the shading portion 12 having a predetermined angle 26 respective to the surface wall 16 of the house, and the photovoltaic portion housing 14a having predetermined angles 28 (which may be different or similar predetermined angles) respective to the shading portion 12, in order to obtain desired shading results with respect to the window 24 of the house or in order to obtain a desired solar power capture/efficiency, or both.

Figure 9:
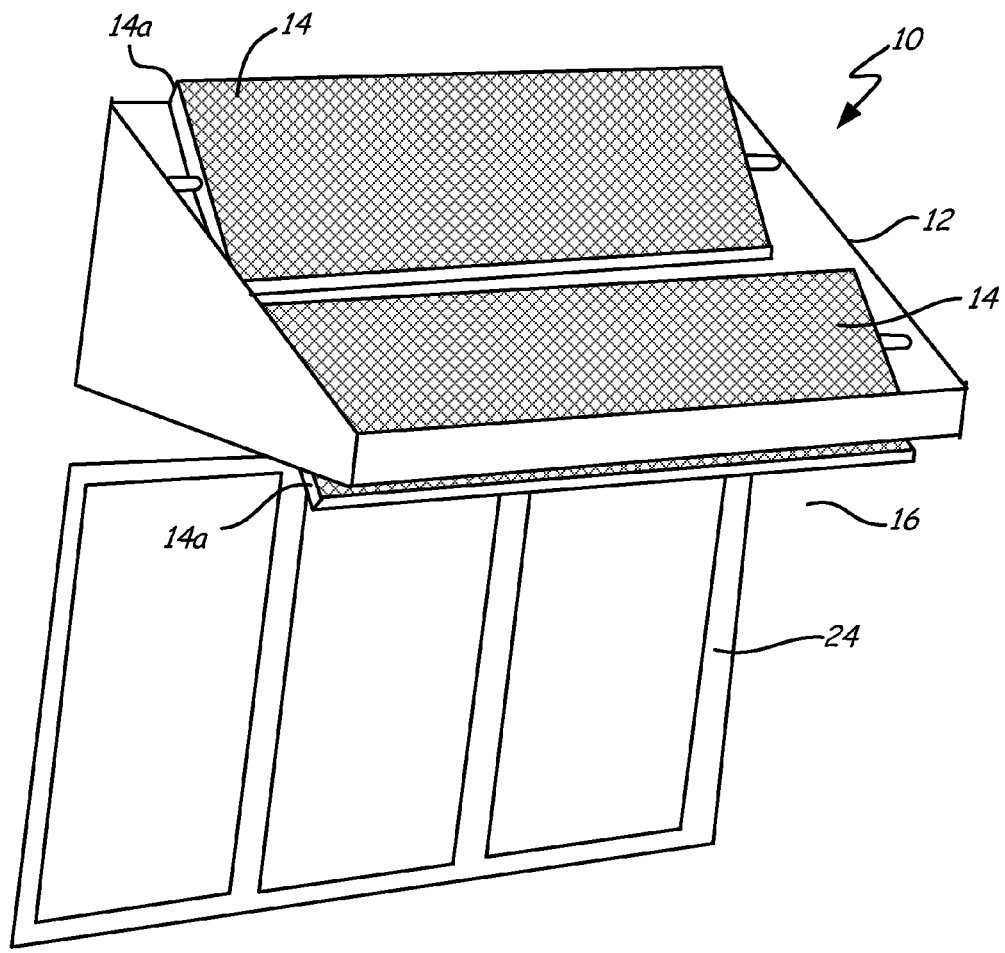
FIG. 9 is a perspective view of another embodiment of a device in accordance with the present invention.

FIG. 9 illustrates a device 10 according to another embodiment of the present invention. The device 10 generally includes at least one shading portion 12 that is operably connected with at least one photovoltaic portion housing 14a, which each house, respectively, at least one photovoltaic portion 14. In this embodiment of the present invention, the shading portion 12 houses a plurality of photovoltaic portion housings 14a and each photovoltaic housing 14a houses a plurality of photovoltaic portions 14. The device 10 is mounted to a surface wall 16 of the house, the shading portion 12 having a predetermined angle (not shown) respective to the surface wall 16 of the house, and the photovoltaic portion housing 14a having predetermined angles (not shown)(which may be different or similar predetermined angles) respective to the shading portion 12 and/or the surface wall 16 of the house, in order to obtain desired shading results with respect to the window 24 of the house or in order to obtain a desired solar power capture/efficiency, or both.

With regards to the present invention, as illustrated in FIGS. 1-9, a shading portion 12 of a device 10 may include any number of materials, designs, shapes and lengths that would serve to shade a window, sidewalk, outdoor recreational apparatus (for example, an outdoor spa or hot tub), or other such features and apparatus as would be contemplated by one of skill in the art, from sunlight and/or other environmental elements. Accordingly, a shading portion 12 may include a variety of shapes and sizes, including but not limited to rectangular, square, curved (dome or canopy, for example) or any combination thereof. A shading portion 12 may include a variety of materials, including but not limited to, plastic, metal, wood, glass, elastic or semi-elastic materials (such as nylon, polyester, canvas, etc) and any combination thereof. A shading portion 12 further may include any predetermined length selected to achieve a desired aesthetic and/or physical result. All of these features may be chosen on a custom basis. Most preferably, a shading portion 12 will easily house and support a photovoltaic portion 14, in its desired shape, size and material (as further described herein). Also, most preferably, a shading portion 12 is comprised of material that is weather-, water- and/or temperature-resistant or tolerant.

With regards to the present invention, as illustrated in FIGS. 1-9, a photovoltaic portion housing 14a and photovoltaic portion 14 of a device 10 may include any number of materials and designs and sizes that would serve to provide sufficient energy to support the energy needs of a low-voltage device (as described herein), in a cost-effective manner. Any material capable of generating photovoltaic properties (as described herein)(for example, a solar panel) is contemplated for use in the present invention, provided that it is includes reliable functionality and is resistant and/or tolerant to environmental elements. The types of materials contemplated for use in housing and placement of the photovoltaic portion 14 at, near or within a shading portion 12 would include, but are not limited to, different types of metals (for example, aluminum), plastics, wood, glass, elastic and semi-elastic materials and fabrics, as well as any number of combinations thereof. Most preferably, the size and shape of the photovoltaic portion 14 provides the desired, reciprocal energy-producing and energy-support effects (for example, the "load" need of a power source 20, which is thereafter transferred to a particular low-voltage device, as effected by a particular geographic region; that is, availability and duration of sunlight exposure) to accommodate as many low-voltage devices as desired.

As shown in FIGS. 2 and 3, a load 22 (for example, a DC (Direct Current) and/or low-voltage device 22) contemplated for use in accordance with the present invention includes, but is not limited to, such devices as lights, ceiling fans (whether interior or exterior) and other similar apparatus. As shown in FIG. 3, wires 18 (such as DC wires) and/or lighter gauge wires (for example, wires which can be cut and spliced easily) may be used to direct power from a photovoltaic portion 14 to an energy storage portion 20 and accordingly, from an energy storage portion to a power control portion (not shown) to or from a load 22. The wires 18 described herein are connected therebetween using supporting devices and methods as would be contemplated by anyone of ordinary skill in the art. Also as shown in FIG. 3, an energy storage portion 20 is used to house the electrical energy collected as a result of the functionality of the photovoltaic portion 20, which will provide power for a load 22. Most preferably, an energy storage portion 20 is a rechargeable battery (or solar rechargeable battery), which includes a basic hard jamming circuit and self-regenerating system (for example, a deep cycle battery).

Examples of such batteries include but are not limited to motorcycle batteries (which are typically effective to 10 degrees below zero, and thus would be preferable for regions experiencing cold climates), forklift batteries, and car batteries, to name a few. Further, it is contemplated herein that batteries 20 may be strung together to obtain the desired load size (battery sizes are optional, as is voltage). Therefore, the load and voltage are both flexible and may be chosen to provide a desired effect. Most preferably, the battery 20 is kept on a charger (for example, a battery tender or a trickle charger). Such a device is preferable due to both its inherently minimal use of the electricity generated by the photovoltaic portion 14 and its ability to keep the battery for a duration of up to 5-6 years or more (cost-effective). It is also preferable that a power control portion 30 (as shown and described in FIG. 10 below and herein) is used to regulate and direct energy. For example, a voltage regulator 30 may be used, which serves to smooth out the transition (for example, prevents or minimizes a stall or kill) when the electricity is generated by the photovoltaic portion 14. More specifically, the use of a voltage regulator is preferable either when electricity is not being drawn by a load 22 or when the sun is not out (for optimal collection of light by the photovoltaic portion 14). A voltage regulator typically regulates approximately 110 volts.

FIG. 10 is a flowchart illustrating an electrical wiring and/or system of at least one embodiment of the present invention, as described herein. One of ordinary skill in the art would recognize the need to consult a regional, national or international electrical code, in conjunction with the following-described system. In at least one embodiment of the present invention, the electrical wiring and/or system may include connectivity between at least one photovoltaic portion 14, at least one energy storage portion 20 (for example, a battery, as earlier described), and at least one load portion 22 (for example, a ceiling fan, as earlier described), each of which are operably connected with at least one power control portion 30 (for example, a voltage regulator, as earlier described).

A power control portion 30 may perform several functions for the system of the present invention. For example, the power control portion 30 may prevent power leakage back through the photovoltaic portion 14 when they are in darkness and may thereby configured to adjust the loading of the photovoltaic portion 14 to maximize energy retrieved from the photovoltaic portions 14 (for example, photovoltaic "cells"). The power control portion 30 may further route power to and from an energy storage portion 20, so as to accommodate any requirements and limitations of the energy storage portion 20. For example, a chemical battery 20 can be charged by the incoming power but must be protected against, for example, overcharging or overheating. Supercapacitors or ultracapacitors 20 also may be used and are typically more tolerant of charging speeds, but have great variations in terminal voltage that must be accommodated. The power control portion 30 may also control the rate of voltage discharge and limits how low the discharged voltage can go to protect the energy storage portion 20 from damage.

In at least one embodiment of the present invention, the power control portion 30 may also regulate the output voltage as needed by various load portions 22, as well as limit the maximum and surge currents that a load portion 22 is likely to draw. The power control portion 30 may also give certain load portions 22, for example, emergency lights 22, higher priority than other load portions 22 operably connected with the system, when the available stored power is running low.

In at least one embodiment of the present invention, the electrical wiring/system may be configured for specific system voltage to accommodate system needs. For example, a system configured around the common automotive battery voltage (which ranges from approximately 11 V to 15 V) can use different load portions 22 designed for automotive and recreational vehicle uses. Commercially available converters can generate 120 V AC from a 12 V system for specific load portions 22 that use a higher voltage.

In at least one embodiment of the present invention, the device 10 may be installed by a commercial entity trained in installing the device 10 and in conformance with local, regional, national or international electrical code, as would be known by one of ordinary skill in the art. It is also contemplated herein that a device 10 may be installed by an individual if sold in kit form, in whole or in part, so long as the applicable electrical code (as earlier described) is implemented.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A customized shading device comprising at least one substantially rigid photovoltaic panel, at least one support portion to house said at least one substantially rigid photovoltaic panel, wherein said at least one support portion substantially frames and encapsulates the outer edges of said at least one substantially rigid photovoltaic panel, and at least one energy storage portion, wherein said at least one substantially rigid photovoltaic panel captures solar energy, wherein said at least one energy storage portion stores said captured solar energy for present or future use and wherein electrical wiring routes energy to at least one predetermined load in a building, and wherein said customized shading device is permanently positioned to a fixed shading position and permanently affixed to a building.

2. The customized shading device of claim 1 wherein said at least one energy storage portion comprises a battery.

3. A customized shading device that is permanently positioned to a fixed shading position and permanently affixed to a building comprising at least one substantially rigid photovoltaic panel, at least one support portion to house said at least one substantially rigid photovoltaic panel, wherein said at least one support portion substantially frames and encapsulates the outer edges of said at least one substantially rigid photovoltaic panel, and at least one energy storage portion, wherein said at least one substantially rigid photovoltaic panel captures solar energy, wherein said at least one energy storage portion stores said captured solar energy for present or future use and wherein said at least one substantially rigid photovoltaic panel is arranged in a predetermined orientation to capture a desired amount of solar energy.

4. The customized shading device of claim 3 wherein said at least one substantially rigid photovoltaic panel arranged in a predetermined orientation to capture a desired amount of solar energy comprises a predetermined angle relative to the surface of said building.

5. The customized shading device of claim 4 wherein said substantially rigid photovoltaic panel comprises a plurality of photovoltaic panels.

6. The customized shading device of claim 3 wherein said custom shading device comprises a canopy over a walkway.

7. The customized shading device of claim 3 wherein said custom shading device comprises at least a portion of the roof of a gazebo.

8. A method of capturing solar energy for at least one load, comprising the steps of: Providing a custom shading device comprising at least one substantially rigid photovoltaic panel and at least one support portion to house said at least one substantially rigid photovoltaic panel, wherein said at least one support portion substantially frames and encapsulates the outer edges of said at least one substantially rigid photovoltaic panel; Installing said shading device such that it is permanently positioned to a fixed shading position and permanently affixed to a building; Providing at least one energy storage device to collect and convert solar energy from said at least one substantially rigid photovoltaic panel to a usable form; and Providing at least one load to which said solar energy may be directed; and Wherein said collected and converted solar energy into said usable form may be used instantly or stored for future use by said load.

9. The method of claim 8 wherein said at least one load comprises a low-voltage load.

10. The customized shading device of claim 1 wherein said at least one support portion comprises a support frame comprised substantially entirely of aluminum.

11. The customized shading device of claim 1 wherein said at least one support portion comprises a support frame comprised substantially entirely of weather-treated wood.

12. The customized shading device of claim 1 wherein said at least one support portion comprises a support frame comprised substantially entirely of rubber.

13. The customized shading device of claim 1 wherein said at least one support portion comprises a support frame comprised substantially entirely of plastic.

14. The customized shading device of claim 1 wherein said at least one predetermined load in a building comprises a low-voltage household appliance.

15. The customized shading device of claim 1 wherein said at least one predetermined load in a building comprises a series of electrical outlets in a room of said building.

16. The customized shading device of claim 1 wherein said at least one at least one substantially rigid photovoltaic panel and said at least one support portion to house said at least one substantially rigid photovoltaic panel comprises a plurality of photovoltaic panels framed within a plurality of support portions, housed sequentially to form a customized shading device.

17. The method of claim 9 wherein said at least one low-voltage load comprises at least one set of exterior building lights.

* * * * *